United States Patent [19]

Jacobson

[11] 4,183,671
[45] Jan. 15, 1980

[54] INTERFEROMETER FOR THE MEASUREMENT OF PLASMA DENSITY

[75] Inventor: Abram R. Jacobson, Los Alamos, N. Mex.

[73] Assignee: The United States of America as represented by the United States Department of Energy, Washington, D.C.

[21] Appl. No.: 886,377

[22] Filed: Mar. 14, 1978

[51] Int. Cl.$^2$ .................................................. G01B 9/02
[52] U.S. Cl. ................................ 356/354; 176/19 R; 356/361
[58] Field of Search ............... 356/354, 345, 349, 361, 356/362; 176/19 R; 73/23, 30

[56] References Cited

U.S. PATENT DOCUMENTS

| | | | |
|---|---|---|---|
| 3,528,029 | 9/1970 | Holmboe et al. | 356/350 |
| 3,539,262 | 11/1970 | Pryor | 356/361 |
| 3,885,874 | 5/1975 | Haas et al. | 356/361 |

OTHER PUBLICATIONS

Jacobson, A. R., "A Novel Interferometer for the Measurement of Plasma Density", Los Alamos Sci. Lab. of Univ. of Cal., Informal Report No. LA-6727-MS.

Buchenauer, C. J. and Jacobson, A. R., "Quadrature Interferometer for Plasma Density Measurements", Rev. of Sci. Instrum., vol. 48, No. 7, (Jul. 1977), pp. 769-774.

Kristal, R. and Peterson, R. W., "Bragg Cell Heterodyne Interferometry of Fast Plasma Events", Rev. of Sci. Instrum., vol. 47, No. 11, (Nov. 1976), pp. 1357-1359.

Primary Examiner—John K. Corbin
Assistant Examiner—Scott J. Sugarman
Attorney, Agent, or Firm—Ray V. Lupo; William W. Cochran II

[57] ABSTRACT

An interferometer which combines the advantages of a coupled cavity interferometer requiring alignment of only one light beam, and a quadrature interferometer which has the ability to track multi-fringe phase excursions unambiguously. The device utilizes a Bragg cell for generating a signal which is electronically analyzed to unambiguously determine phase modulation which is proportional to the path integral of the plasma density.

7 Claims, 3 Drawing Figures

INTERFEROMETER FOR THE MEASUREMENT OF PLASMA DENSITY

BACKGROUND OF THE INVENTION

The present invention pertains generally to interferometers and more particularly to interferometers for determining plasma density.

FIG. 1 illustrates a typical prior art coupled cavity interferometer. The advantage of this device is that it uses a single external reflector which is aligned with a laser source through a contained plasma. As such, the device is easily aligned and simply adapted to various sytems in which measurements of plasma density are required.

Notwithstanding these advantages, the coupled cavity interferometer cannot track multi-fringe phase excursions unambiguously, has limited differential sensitivity, is affected by refractive bending of the scene beam and requires external calibration.

FIG. 2 schematically illustrates a quadrature interferometer which utilizes polarization optics to obtain signals, i.e., sin $\phi$ and cos $\phi$, which unambiguously identify multi-fringe phase excursions. Moreover, the quadrature interferometer has excellent and uniform differential sensitivity, is relatively immune to small refractive bending in the scene beam and is automatically calibrated. Unlike the coupled cavity interferometer, however, the quadrature interferometer requires alignment of numerous optical elements as shown in FIG. 2, which in many cases, cannot be accomplished due to space limitations. In addition, the polarizing optics are expensive and time consuming to align to achieve the desired results.

SUMMARY OF THE INVENTION

The present invention overcomes the disadvantages and limitations of the prior art by providing an interferometer which combines the advantages of the coupled cavity and quadrature interferometer. The device of the present invention utilizes electronic circuitry in a simple optical arrangement utilizing only one external optical element, in combination with electronic circuitry for unambiguously identifying changes in plasma density.

It is therefore an object of the present invention to provide an improved interferometer for measuring plasma density.

It is also an object of the present invention to provide an improved interferometer for measuring plasma density in a simple and easy manner.

Another object of the present invention is to provide an interferometer for measuring plasma density which can be easily aligned.

Another object of the present invention is to provide an improved interferometer for the measurement of plasma density which generates signals containing complete information of a quadrature interferometer.

Other objects and further scope of applicability of the present invention will become apparent from the detailed description given hereinafter. The detailed description, indicating the preferred embodiment of the invention, is given only by way of illustration since various changes and modifications within the scope of the invention will become apparent to those skilled in the art from this detailed description. The foregoing abstract of the disclosure is for the purpose of providing a nonlegal brief statement to serve as a searching and scanning tool for scientists, engineers and researchers and is not intended to limit the scope of the invention as disclosed herein, nor is it intended to be used in interpreting or in any way limiting the scope or fair meaning of the appended claims.

DETAILED DESCRIPTION OF THE PREFERRED EMBODIMENT OF THE INVENTION

Figure 1:
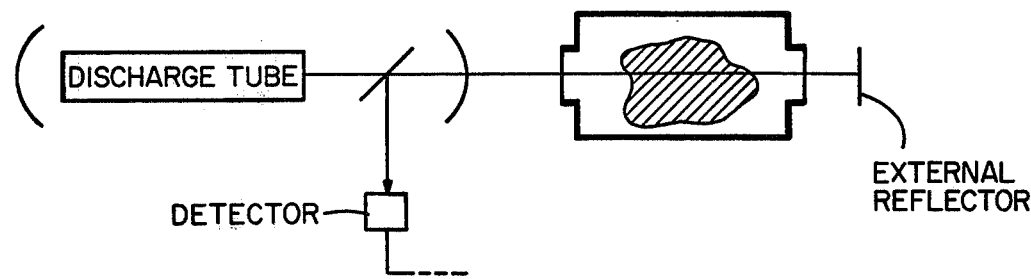
FIG. 1 is a prior art schematic drawing of a coupled cavity interferometer.
Figure 2:
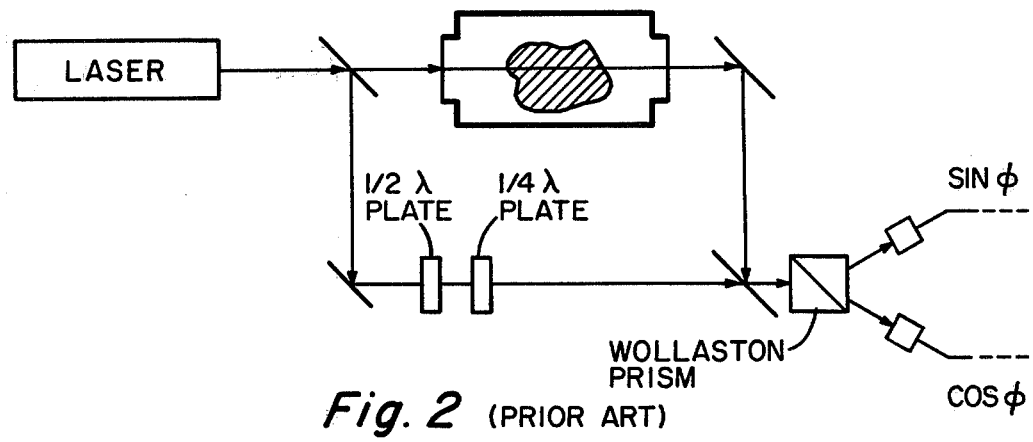
FIG. 2 is a prior art schematic drawing of a quadrature interferometer.
Figure 3:
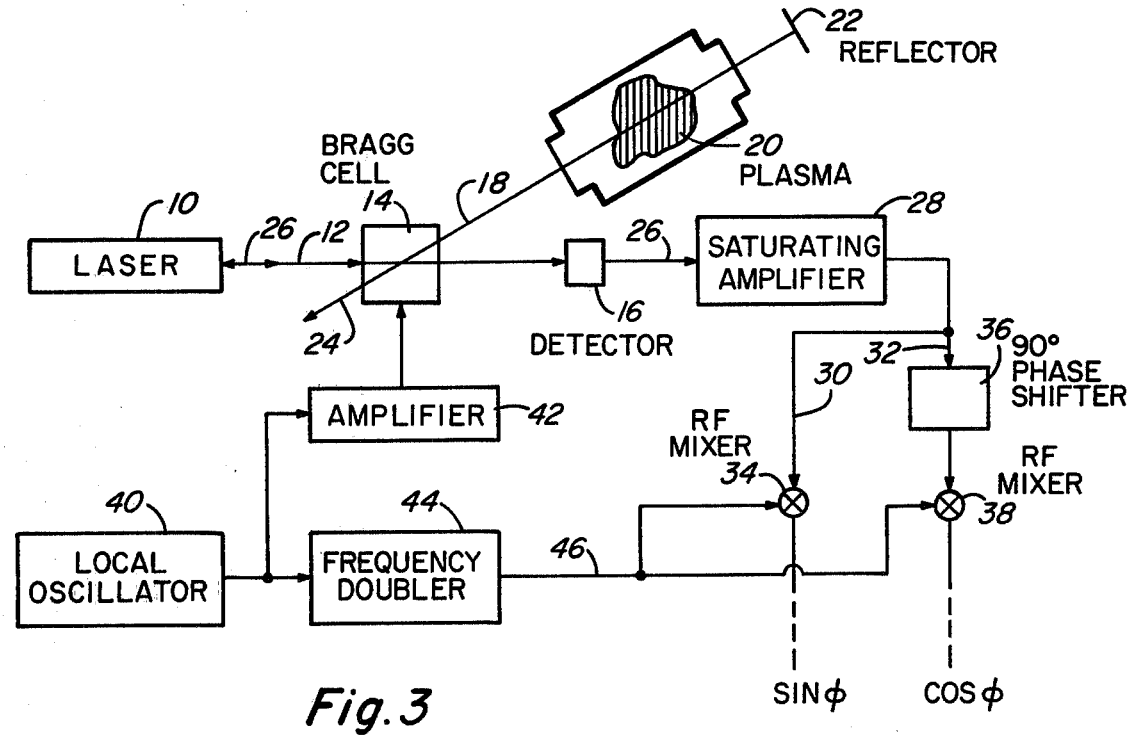
FIG. 3 is a schematic drawing of the preferred embodiment of the invention.

FIG. 3 schematically illustrates the optical components of the present invention in combination with a block diagram of the electronic circuitry, which together comprise the preferred embodiment of the invention. As shown in FIG. 3, a laser 10, e.g., a helium neon 6328 A laser, produces an output 12 which enters an acousto-optic Bragg cell 14 where the light is split into zero order and first order diffraction beams. The zero order beam penetrates Bragg cell 14 without diffraction and is directed to a detector 16 which comprises, e.g., a PIN photodiode detector. The first order diffracted beam 18 exits the Bragg cell and is directed through a contained plasma 20 to a reflector 22. Reflector 22 retroreflects the first order beam 18 back through plasma 20 to the Bragg cell 14 along the same path. The retroreflected first order beam 18 passes again through the Bragg cell and is split into two beams, i.e., a zero order beam 24 which is lost, and a first order diffracted beam 26 which is reflected from the exit mirror of laser 10. The beam 26 has, therefore, been twice Doppler shifted by the Bragg cell. Consequently, the doubly Doppler shifted beam does not couple to the lasing process, thereby avoiding spurious amplitude modulation of the laser output. For example, in a device using a Bragg cell frequency of 40 MHz, beam 26 is Doppler shifted by 80 MHz relative to the original longitudinal mode spacing of the laser which, for this example, comprises 435 MHz.

Interference between beam 26 which comprises the retroreflected first order doubly Doppler shifted signal, and the zero order signal from the beam 12 emitted by the laser, causes modulation of the signal at detector 16 at twice the acoustic drive frequency of the Bragg cell. Furthermore, changes of the optical path length from the laser to the reflector 22 and back cause phase modulation of the detected carrier such that plasma density excursions in the line of sight of beam 18 generate phase modulation of the detected 80 MHz carrier. In other words, phase modulation of the 80 MHz carrier signal is representative of changes in the density of plasma 20. The remaining elements comprise electronic circuitry for generating signals which unambiguously identify these plasma density excursions.

The detected photo-current signal 26 is amplified by saturating amplifier 28 and split into two channels 30 and 32. Channel 30 is fed to an RF mixer 34, while channel 32 is shifted by 90° by phase shifter 36 before being fed to RF mixer 38.

Local oscillator 40 generates a 40 MHz drive signal which is applied to amplifier 42 to drive the Bragg cell 14. The local oscillator signal is also applied to a frequency doubler 44 to drive an 80 MHz signal which is synchronous with the Bragg cell 40 MHz drive. Frequency doubler 44 provides a reference signal 46 which is split and applied to RF mixers 34 and 38. Since the detector inputs to mixers 34 and 38 differ in phase by 90°, one output is proportional to sin $\phi$ and the other proportional to cos $\phi$, where $\phi$ represents any phase shift introduced by changes in path length between the laser and the retroreflecting mirror. The output signals are uniquely and permanently calibrated since saturating amplifier 28 eliminates all amplitude modulation and retains phase information. In this manner, the sine and cosine signals contain the complete information of the quadrature interferometer and are permanently calibrated as long as the detector signal 26 does not drop below the required input level of the saturating amplifier 28. At the same time, adjustment of only one mirror, i.e., reflector 22, is required, as in the coupled cavity device, so as to greatly simplify the adjustment procedure of the preferred embodiment.

The present invention therefore provides a device which has the advantage of a coupled cavity interferometer, i.e., the adjustment of a single external mirror, and provides signals which track multi-fringe phase excursion unambiguously with excellent and uniform differential sensitivity, relative immunity to small refractive bending of the scene beam and automatic calibration, such as in the quadrature interferometer. The present invention therefore provides a unique signal in a system which can be utilized in a simple and easy manner.

What I claim is:

1. An interferometer for generating signals representative of the density of a plasma comprising:
   a source of laser radiation;
   a Bragg cell aligned with said laser radiation and having a predetermined dirve frequency $\nu$;
   means for generating a detector signal;
   reflective means aligned to retroreflect first order radiation from said Bragg cell through said plasma back to said Bragg cell to beat zero order radiation from said Bragg cell by $2\nu$ plus phase modulation ($\phi$) introduced by said plasma;
   means for electronically generating sin $\phi$ and cos $\phi$ from said detector signal.

2. The interferometer of claim 1 wherein said means for generating a detector signal comprises a PIN photodiode detector.

3. The interferometer of claim 1 wherein said reflective means comprises an external mirror.

4. The interferometer of claim 1 wherein said predetermined drive frequency $\nu$ is 40 MHz.

5. The interferometer of claim 1 wherein said means for electronically generating sin $\phi$ and cos $\phi$ comprises:
   means for generating a synchronous $2\nu$ signal;
   means for mixing said synchronous $2\nu$ signal with said detector signal to generate sin $\phi$;
   means for phase shifting said detector signal by 90°;
   means for mixing said phase shifted detector signal with said synchronous $2\nu$ signal to generate cos $\phi$.

6. A device for generating signals representative of the density of a plasma comprising:
   a source of coherent radiation;
   acousto-optic Bragg cell means for diffracting said coherent radiation into a zero order signal and a Doppler shifted first order signal;
   means for retroreflecting said Doppler shifted first order signal through said plasma to generate a phase modulated first order signal proportional to plasma density excursions, and through said acous-to-optic Bragg cell means to generate a doubly Doppler shifted, phase modulated first order signal;
   means for generating a detector signal representative of interference between said zero order signal and said doubly Doppler shifted, phase modulated first order signal;
   means for electronically generating signals representative of the sine and cosine of phase modulation ($\phi$) proportional to the path integral of the plasma density.

7. The device of claim 6 wherein said means for electronically generating signals representative of the sine and cosine of phase modulation comprises:
   means for generating a synchronous electrical reference signal;
   means for mixing said synchronous electrical reference signal with said detector signal to generate an electrical signal representative of sin $\phi$;
   means for generating a detector signal shifted by 90°;
   means for mixing said synchronous electrical reference signal with said detector signal shifted by 90° to generate an electrical signal representative of cos $\phi$.

* * * * *